(12) United States Patent
Free

(10) Patent No.: US 8,824,747 B2
(45) Date of Patent: Sep. 2, 2014

(54) SKIN-TONE FILTERING

(75) Inventor: Robert Mikio Free, San Jose, CA (US)

(73) Assignee: Apple Inc., Cupertino, CA (US)

( * ) Notice: Subject to any disclaimer, the term of this patent is extended or adjusted under 35 U.S.C. 154(b) by 667 days.

(21) Appl. No.: 12/826,617

(22) Filed: Jun. 29, 2010

(65) Prior Publication Data
US 2011/0317917 A1  Dec. 29, 2011

(51) Int. Cl.
*G06K 9/00* (2006.01)
(52) U.S. Cl.
CPC ................................. *G06K 9/00234* (2013.01)
USPC .......................................... 382/118; 382/167
(58) Field of Classification Search
None
See application file for complete search history.

(56) References Cited

U.S. PATENT DOCUMENTS

| | | | |
|---|---|---|---|
| 5,852,669 A | 12/1998 | Eleftheriadis et al. | |
| 5,982,912 A | 11/1999 | Fukui et al. | |
| 6,108,437 A | 8/2000 | Lin | |
| 6,111,517 A | 8/2000 | Atick et al. | |
| 6,259,428 B1* | 7/2001 | Ramchandani et al. | 345/589 |
| 6,600,830 B1 | 7/2003 | Lin et al. | |
| 6,975,750 B2 | 12/2005 | Yan et al. | |
| 7,130,454 B1 | 10/2006 | Berube et al. | |
| 7,200,249 B2 | 4/2007 | Okubo et al. | |
| 7,239,726 B2 | 7/2007 | Li | |
| 7,315,630 B2 | 1/2008 | Steinberg et al. | |
| 7,418,116 B2 | 8/2008 | Fedorovskaya et al. | |
| 7,466,866 B2 | 12/2008 | Steinberg | |
| 7,783,085 B2 | 8/2010 | Perlmutter et al. | |
| 2005/0063568 A1* | 3/2005 | Sun et al. | 382/117 |
| 2005/0117026 A1* | 6/2005 | Koizumi et al. | 348/222.1 |
| 2006/0098846 A1* | 5/2006 | Kuwabara et al. | 382/107 |
| 2007/0153091 A1 | 7/2007 | Watlington et al. | |
| 2007/0154095 A1* | 7/2007 | Cao et al. | 382/190 |
| 2007/0200916 A1 | 8/2007 | Han | |
| 2008/0080766 A1 | 4/2008 | Payonk et al. | |
| 2008/0117305 A1 | 5/2008 | Rogers et al. | |
| 2009/0082066 A1* | 3/2009 | Katz | 455/566 |
| 2009/0133051 A1 | 5/2009 | Hildreth | |
| 2010/0066763 A1* | 3/2010 | MacDougall et al. | 345/656 |
| 2010/0079508 A1* | 4/2010 | Hodge et al. | 345/697 |

(Continued)

FOREIGN PATENT DOCUMENTS

WO    WO2004010365 A3    7/2004

OTHER PUBLICATIONS

Hsien-Che Lee, Introduction to Color Imaging Science, Cambridge University Press, Feb. 24, 2005—ISBN-10: 0521103134.*

(Continued)

*Primary Examiner* — Wesley Tucker
*Assistant Examiner* — Ha Le
(74) *Attorney, Agent, or Firm* — Wong, Cabello, Lutsch, Rutherford & Brucculeri LLP

(57) ABSTRACT

Methods, systems, and apparatus, including computer programs encoded on a computer storage medium, are disclosed relating to skin-tone filtering for reducing the impact of lighting conditions, while providing a low-computation solution for effective face detection. In one aspect, methods include sampling a digital image frame from among a series of digital image frames. The methods further include analyzing pixels within the sampled digital image frame to determine whether pixels in the sampled digital image frame have a hue, independent of lightness, that is within a range of hues corresponding to human skin tone. Further, the methods include deciding whether the sampled digital image frame includes a depiction of human skin based on a result of the analyzing.

16 Claims, 8 Drawing Sheets

(56) References Cited

U.S. PATENT DOCUMENTS

| | | | |
|---|---|---|---|
| 2010/0172581 A1* | 7/2010 | Husoy | 382/165 |
| 2011/0006707 A1* | 1/2011 | Baaijens | 315/307 |
| 2011/0222556 A1* | 9/2011 | Shefler et al. | 370/465 |

OTHER PUBLICATIONS

Paul Viola and Michael Jones, Jul. 2003, "Robust Real-Time Face Detection" International Journal of Computer Vision 57(2), 137-154, 2004, Kluwer Academic Publishers. Manufactured in The Netherlands.*
Andreas Koschan and Moogi Abidi, 2008, Digi tal color Image processing ISBN 978 0-470-1 4708 5.*
Anil K. Jain, Arun Ross and Salil Prabhakar, An Introduction to Biometric Recognition, IEEE Transactions on Circuits and Systems for Video Technology, vol. 14, No. 1, Jan. 2004.*
NPL, Chai et al. Face Segmentation Using Skin-Color Map in Videophone Applications (IEEE, Jun. 1999).*
NPL—Kovac (J. Kovac, Peer and F. Solina, Human Skin Colour Clustering for Face Detection, in: Proceedings of International Conference on Computer as a Tool, Slovenia, Sep. 22-24, 2003, vol. 2, pp. 144-148).*
Tan et al., "Face Recognition from a Single Image per Person: A Survey", Department of Computer Science and Engineering, Nanjing University of Aeronautics & Astronautics, Nanjing 210016, China; National Laboratory for Novel Software Technology, Nanjing University, Nanjing 210093, China; State Key Laboratory of Pattern Recognition, Institution of Automation, Chinese Academy of Sciences, Beijing 100080, China, 2006, pp. 1-34.
Zhao et al., "Face Recognition: A Literature Survey", ACM Computing Surveys, vol. 35, No. 4, Dec. 2003, pp. 399-458.
Yang et al., "Face Detection and Gesture Recognition for Human-Computer Interaction", Kluwer Academic XP-002659258, Jan. 1, 2001, pp. 12-21.
Gong et al., "Dynamic Vision: from Images to Face Recognition", Imperial College Press, XP-002659259, Jan. 1, 2000, pp. 20-25, 66, 67, 92, 93, 138, 139.
Etemad et al., "Discriminant analysis for recognition of human face images", J. Opt. Soc. Am. A, Aug. 1, 1997, vol. 14, No. 8, pp. 1724-1733.
Nagel, "Algorithms and VLSI Architectures for Low-Power Mobile Face Verification", PhD Thesis, Universite de Neuchatel, Jun. 2, 2005, 286 pages.
Dave et al., "Face Recognition in Mobile Phones", Department of Electrical Engineering, Stanford University, Jun. 7, 2010, 7 pages.
Hadid et al., "Face and Eye Detection for Person Authentication in Mobile Phones", First ACM/IEEE International Conference, Sep. 1, 2007, pp. 101-108.
Authorized Officer Brigitte Chiarizia, Invitation to Pay Additional Fees and, Where Applicable, Protest Fee, International Application No. PCT/US20111042204, mailed Oct. 10, 2011, 5 pages.
Li, "An Efficient Face Normalization Algorithm Based on Eyes Detection", 2006 IEEE/RS, J Dept. of Automation and Computer Aid Engineering—Chinese University of Hong Kong, China, Oct. 9-15, 2006, pp. 3843-3848.
Authorized Officer Cristina Darolti, International Search Report and Written Opinion, International Application No. PCT/US2011/042204, mailed Feb. 22, 2012, 17 pages.
Fish and Richardson P.C., Response to Non-final Office Action in U.S. Appl. No. 12/826,581, filed Jul. 6, 2012, 11 pages.
Subasic, et al., "Face Image Validation System", Proceedings of the 4th International Symposium on Image and Signal Processing and Analysis (2005), pp. 30-33.
Horng, et al., "Driver Fatigue Detection Based on Eye Tracking and Dynamic Template Matching", Proceedings of the 2004 IEEE International Conference on Networking, Sensing & Control, Taipei, Taiwan, Mar. 21-23, 2004, pp. 7-12.

* cited by examiner

SKIN-TONE FILTERING

BACKGROUND

This specification relates to skin-tone filtering of digital images and specifically relates to the use of skin-tone filters as part of face detection techniques, for example, for reducing the impact of lighting conditions.

Most face detection algorithms fall into two categories. A first category of algorithms, such as Open CV, and the like, can address various lighting conditions, image orientations and scales, and therefore, are computationally expensive. A second category of algorithms, based on face biometrics, are specialized for security-type applications and can work under controlled lighting conditions. Adopting the first category systems for face detection on consumer operated portable appliances that are equipped with a camera would unnecessarily use an appliance's computing resources and drain its power. Moreover, as the consumer portable appliances tend to be used both indoor and outdoor, the second category systems for face detection may be ineffective.

SUMMARY

This specification describes technologies relating to skin-tone filtering for reducing the impact of lighting conditions, while providing a low-computation solution for effective face detection that can be implemented on camera-equipped consumer portable appliances.

In general, one aspect of the subject matter described in this specification can be implemented in methods performed by an image processor that include the actions of sampling a digital image frame from among a series of digital image frames. The methods further include analyzing pixels within the sampled digital image frame to determine whether pixels in the sampled digital image frame have a hue, independent of lightness, that is within a range of hues corresponding to human skin tone. Further, the methods include deciding whether the sampled digital image frame includes a depiction of human skin based on a result of the analyzing.

These and other implementations can include one or more of the following features. In some implementations, the range of hues corresponding to human skin tone can be determined in a hue space where a red hue has a value of 0, a green hue has a value of 120 degrees and a blue hue has a value of 240 degrees. The methods can further include centering the range of hues corresponding to human skin tone on a value of 25 degrees associated with skin tone orange. Further, the methods can include extending the range of hues corresponding to human skin tone over 40 degrees.

In some implementations, analyzing can include determining respective distances from hues of pixels in the sampled digital image frame to a hue corresponding to skin-tone orange, and generating an orange-distance filtered frame including the determined distances and corresponding to the sampled digital image frame. Further, if the analysis is performed in a hue space defined by an angular coordinate such that red corresponds to zero, green corresponds to 120 degrees and blue is 240 degrees, then determining the respective distances includes subtracting from hue-values of pixels a value of 25 degrees corresponding to skin-tone orange. Furthermore, if the analysis is performed in a two-dimensional (2D) hue space, then determining the respective distances includes calculating 2D Cartesian distances from hue-coordinates of pixels to a location in 2D color space corresponding to skin-tone orange.

In some implementations, deciding includes segmenting a skin-tone orange portion of the orange-distance filtered frame having distances to skin-tone orange less than a threshold distance to represent the depiction of human skin. The methods can further include obtaining the series of digital image frames from an image capture device associated with the image processor. Also, the methods can include determining a change in area of the skin-tone orange portion corresponding to the sampled frame relative to a previously sampled frame to represent likely back-and-forth movement of a face in front of the image capture device. Further, the methods can include determining a change in location of the skin-tone orange portion corresponding to the sampled frame relative to a previously sampled frame to represent likely lateral movement of the face in front of the image capture device. Furthermore, the methods can include detecting a face within the skin-tone orange portion corresponding to the sampled frame when the determined changes in area and location are less than respective predetermined variations.

In some implementations, the methods can include accessing shape classifiers generated for detecting shapes corresponding to faces within skin-tone orange portions of orange-distance filtered images, and detecting a face within the skin-tone orange portion of the orange-distance filtered frame corresponding to the sampled digital image frame by using the accessed shape classifiers. In some implementations, the methods include generating the shape classifiers by a classification application. Generating the shape classifiers can include retrieving, from a shape library, images of shapes and shape combinations corresponding to a face depicted in a given color space. For example, the shapes correspond to the face include at least an eye, a nose a mouth, and the shape combinations correspond to the face include at least eyes, eyes and a nose, a nose and a mouth. Generating the shape classifiers can further include producing orange-distance filtered versions of the retrieved images of shapes and shape combinations. Further, generating the shape classifiers can include assembling the orange-distance filtered images of shapes and shape combinations into the generated shape classifiers, and storing the generated shape classifiers by the classification application to be accessed by image processors for detecting faces within skin-tone orange portions of orange-distance filtered images.

According to another aspect, the described subject matter can also be implemented in an appliance including a data storage device configured to store rules for acknowledging a detected face. The appliance further includes an image capture device, e.g., a camera, configured to acquire color frames. Further, the appliance includes one or more data processors configured to apply an orange-distance filter to a frame acquired by the image capture device for segmenting a skin-tone orange portion. The one or more data processors are further configured to determine respective changes in an area and a location of the skin-tone orange portion of the acquired frame relative to a previously acquired frame. Also, the one or more data processors are configured to infer, based on the determined changes, a presence of a face substantially at rest when the frame was acquired. In addition, the one or more data processors are configured to detect a face corresponding to the skin-tone orange portion of the acquired frame in response to the inference, and to acknowledge the detected face in accordance with a predetermined rule stored on the data storage device of the appliance.

These and other implementations can include one or more of the following features. To apply the orange-distance filter, the one or more processors can be further configured to determine respective distances from hues of pixels in the acquired frame to a hue corresponding to skin-tone orange. The one or more data processors can be further configured to generate an orange-distance filtered frame including the determined distances and corresponding to the acquired frame, and to segment a portion of the orange-distance filtered frame having distances to skin-tone orange less than a threshold distance to represent a depiction of a face. If the application of the orange distance filter is performed in a hue space defined by an angular coordinate such that red corresponds to zero, green corresponds to 120 degrees and blue is 240 degrees, then to determine the distances the one or more processors are further configured to subtract from hue-values of pixels a value of 25 degrees corresponding to skin-tone orange. If the application of the orange distance filter is performed in a two-dimensional (2D) hue space, then to determine the distances the one or more processors are further configured to calculate 2D Cartesian distances from hue-coordinates of pixels to a location in 2D color space corresponding to skin-tone orange.

In some implementations, to acknowledge the detected face the one or more processors are further configured to turn on a display of the appliance located on a same side as the image capture device if the display had been off prior to the face detection. In some implementations, to acknowledge the detected face the one or more processors are further configured to turn on a transceiver of the appliance which was turned off prior to the face detection.

According to another aspect, the described subject matter can also be implemented in a system including a storage system configured to store shape classifiers used for face detection. The system further includes one or more data processors configured to retrieve, from a shape library stored on the storage system, images of shapes and shape combinations corresponding to a face depicted in a given color space. The shapes corresponding to the face include at least an eye, a nose a mouth, and the shape combinations corresponding to the face include at least eyes, eyes and a nose, a nose and a mouth. The one or more data processors are further configured to produce orange-distance filtered versions of the retrieved images of shapes and shape combinations, and to generate shape classifiers for detecting shapes corresponding to faces within skin-tone orange portions of orange-distance filtered images of shapes and shape combinations. The storage system is further configured to store the generated shape classifiers to be provided upon requests of image processing devices that connect to the system.

These and other implementations can include one or more of the following features. To produce the orange-distance filtered versions of the retrieved images of shapes and shape combinations the one or more processors are further configured to determine respective distances from hues of pixels in each retrieved image to a hue corresponding to skin-tone orange, and generate an orange-distance filtered image including the determined distances for each corresponding retrieved image. In some implementations, the one or more processors are further configured to maintain rules for using the generated shape classifiers for detecting faces within skin-tone orange portions of orange-distance filtered images, and to update the maintained rules based on feedback collected from the image processing devices that have used the generated shape classifiers and maintained rules.

Particular implementations of the subject matter described in this specification can be configured to realize one or more of the following potential advantages. The techniques and systems disclosed in this specification can reduce the impact of lighting and emphasize skin variance. Further, by ignoring the brightness (luminosity and saturation) of an image, the disclosed methods can attenuate the effects of ethnicity, e.g., highlights and shadows that accompany skin-tone orange in proportions that are ethnicity-specific. Moreover, the skin-tone distance filtering described in this specification in combination with custom generated classifiers (for motion, facial features, etc) can improve the accuracy of face detection algorithms applied to color images.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Computational, memory and/or power reducing techniques for performing skin-tone filtering are described including use of skin-tone distance filters.

Figure 1:
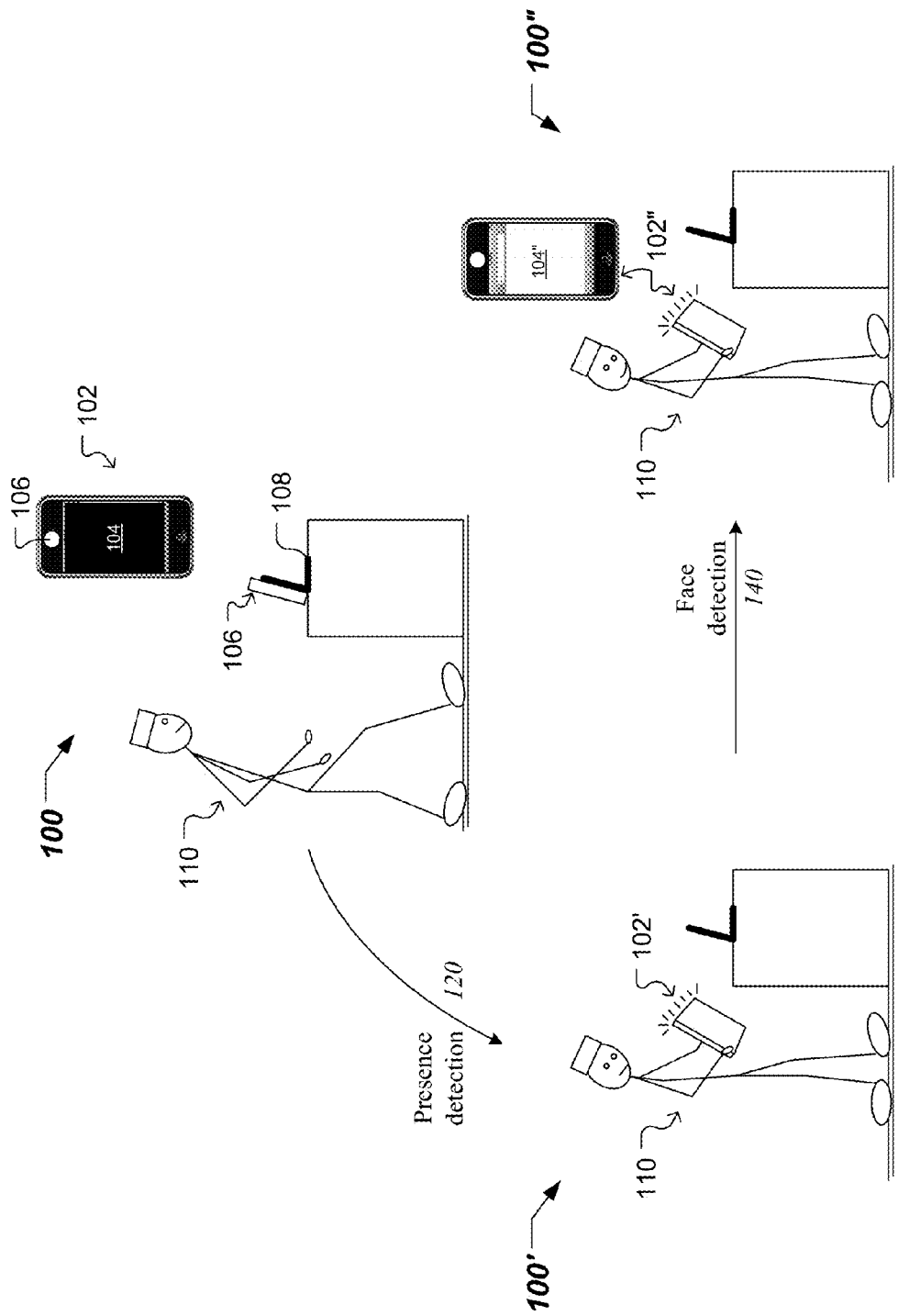
FIG. 1 shows an example of a computerized appliance for implementing the methods disclosed in this specification.

FIG. 1 shows an example of a computerized appliance 102. The appliance 102 includes a display 104 and an image capture device 106, e.g., a camera located display-side. Under low-load, low-power consumption conditions, e.g., when the appliance 102 rests unused on a support 108, the display 104 can be turned off while the forward-looking camera 106 can remain on. Methods disclosed in this specification can be implemented by the appliance 102 for providing low threshold face recognition of a user 110 associated with the appliance 102, where there is a tolerance for a certain level of false positives.

Panel 100 shows a potential user 110 who is approaching the appliance 102. In response to the appliance 102 detecting 120 that the potential user 110 stops in front of and faces the camera 106, the appliance can transition to a new state 102' to acknowledge the presence and attention of the potential user 110, as illustrated in panel 100'. In some implementations, the appliance 102' acknowledges the presence of the potential user 110 by turning on the display 104. Further in response to detecting the presence of the potential user 110, the appliance 102' can trigger a subsequent process for detecting 140 the potential user's face.

Responsive to the appliance 102' detecting 140 the potential user's face, the appliance can transition to a new state 102" to acknowledge the face detection, as shown in panel 100". In some implementations, the appliance 102" acknowledges the face detection by turning on the display 104".

The methods disclosed in this specification can detect a face of a potential user 110 without computing resources overhead that is characteristic of other face detection techniques. Therefore, the face detection methods described in this specification can be implemented in hardware, for example in graphical processing units (GPUs), of computerized appliances 102. The disclosed hardware implementation has several advantages. As frames are acquired by the camera 106 of the appliance 102, the frames represent color, un-rotated digital images. In contrast, when importing an image in a software-implemented image processing application, it is unknown prior to obtaining the image whether the image is black-and-white or color. Another advantage of the disclosed implementation is that the image is taken under normal lighting (illumination) conditions, so there is little or no need for white-balance compensation. The disclosed techniques can potentially substitute computationally expensive face detection algorithms. For example, the disclosed techniques can run inexpensively, using little power, on mobile devices and appliances, such as smart phones, tablet computers, laptops and the like.

Figure 2:
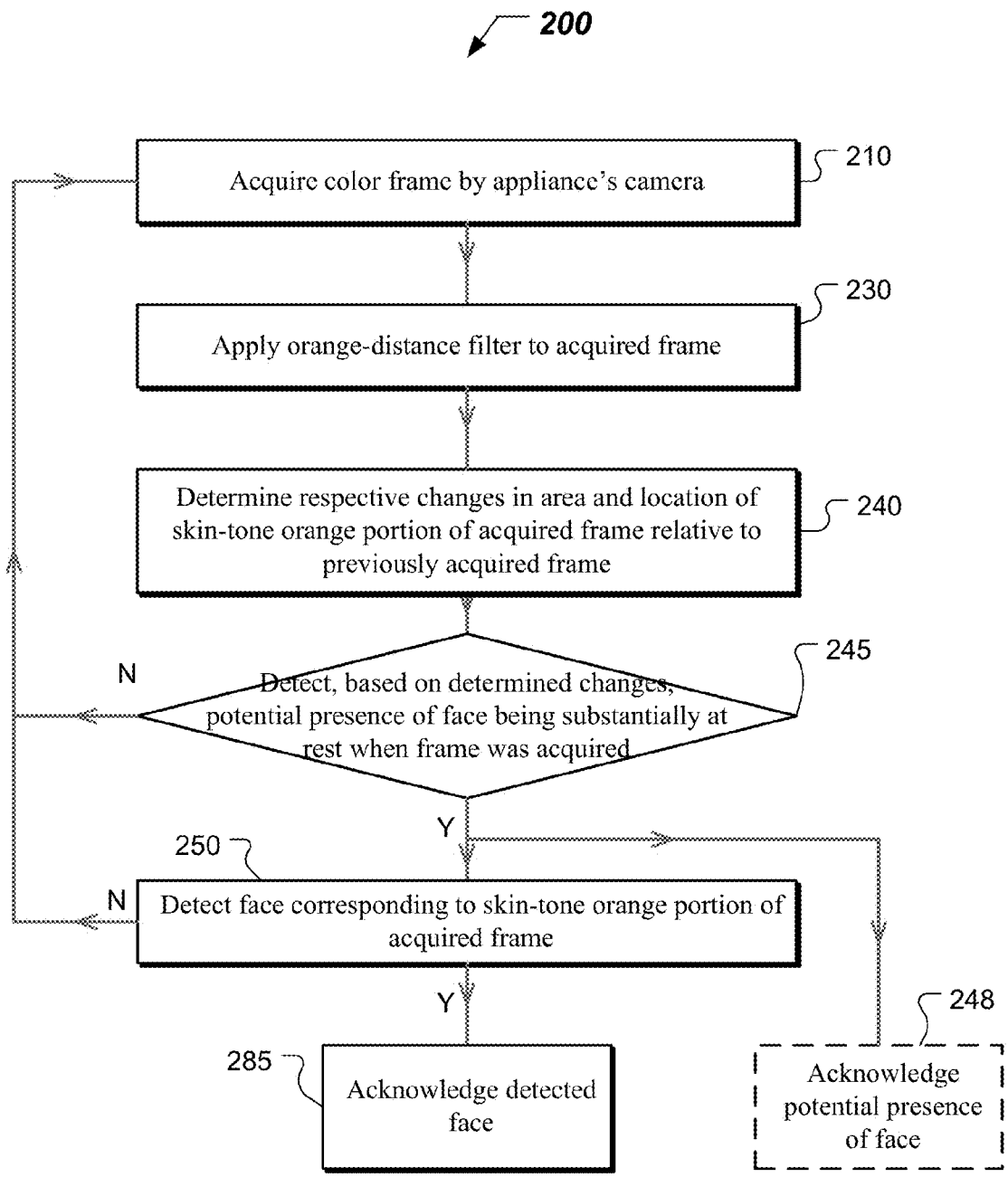
FIG. 2 shows an example process for detecting a face in a frame acquired by an image capture device of an appliance.

FIG. 2 shows an example process 200 for detecting a face within a frame acquired by a camera of an appliance. In some implementations, the process 200 can be implemented in hardware or firmware of a computerized appliance equipped with a camera. A color frame is acquired 210. Referring to FIG. 1, although the display 104 of the appliance 102 is turned off, the appliance's camera 106 is on and captures frames repeatedly. In some cases, the frames can be captured at video rates. In other cases, the frames can be captured based on a predetermined schedule, e.g., a frame can be acquired every $N^{th}$ video frame, where N can be 10, 20, 120, etc.

The acquired frame is filtered 230 using an orange-distance filter. For example, referring to FIG. 1, a frame containing an image of the user 110 captured by the camera 106 of the appliance 102 is preconditioned to neutralize lighting effects and to emphasize facial features, such as freckles, skin discolorations/variations, and the like. A process for preconditioning an acquired color image using an orange-distance filter is described in detail below in connection with FIGS. 3A and 3C.

Respective changes in area and location of a skin-tone orange portion of the acquired frame are determined 240 relative to a previously acquired frame. For example, referring to FIG. 1, once a frame containing an image of a user 110 captured by the camera 106 of the appliance 102 has been preprocessed using an orange-distance filter, the orange-distance filtered image can be masked for skin-tone to locate the largest, central segment of skin-tone. Masking for skin-tone can include retaining a portion of the image having color values that are within a predetermined distance from orange. The skin-tone orange portion of the captured frame can represent the skin of user 110. Further, a skin-tone orange portion located centrally in the image can represent a face of user 110. Moreover, the appliance 102 can calculate an area of the skin-tone orange portion, e.g., as a fraction of the total image. In addition, appliance 102 can calculate a location of the skin-tone orange portion defined as pixel-coordinates (x_CM, y_CM) of the center of mass of the masked skin-tone orange portion.

By determining a change in the area of the skin-tone orange portion of the acquired frame relative to the previously acquired frame, the appliance 102 can learn whether (i) the user's face is approaching toward the front of the camera 106 (if the area of the skin-tone orange portion increases between consecutively acquired frames,) (ii) the user's face is backing away from the front of the camera 106 (if the area of the skin-tone orange portion decreases between consecutively acquired frames,) or (iii) the user's face is located at a constant distance in front of the camera 106 (if the area of the skin-tone orange portion is substantially constant between consecutively acquired frames.) In the later case (iii), the appliance 102 can also determine a change in the location of the skin-tone orange portion of the acquired frame relative to the previously acquired frame, to learn whether (iii.a) the user's face is moving laterally in front of the camera 106 (if the location of the constant-area skin-tone orange portion shifts left or right between consecutively acquired frames,) or (iii.b) the user's face is located at a fixed location in front of the camera 106 (if both the area and the location of the skin-tone orange portion remain substantially constant between consecutively acquired frames.)

If a result of the determination 240 corresponds to case (iii.b) described above, then a potential presence of a face that is at rest and faces the camera 106 is detected 245. For example, referring to FIG. 1, the skin-tone orange portion of the acquired frame can be designated as input for detecting 250 a face of a user 110 being at rest in front of and facing the camera 106 when the frame is acquired. A process for identifying potential presence of a face being at rest in front of a camera is described in detail below in connection with FIG. 4. In some implementations, detection of a potential presence of the user's face can be optionally acknowledged 248. For example, the display 204 of the appliance 102 that was previously turned off to save battery life can be turned on to acknowledge the potential presence of the user's face. If a result of the determination 240 corresponds to cases (i), (ii) or (iii.a) associated with the user's face moving in front of the camera 206, as described above, then a potential presence of a face that is at rest and faces the camera 106 is not detected 245. In this case, a subsequent frame is acquired 210 by the appliance's camera 106 and the method 200 is carried out in a manner described above.

A face corresponding to the skin-tone orange portion of the acquired frame is detected 250 by finding eyes and a mouth of the face. For example, two eyes can be detected in an upper third of the skin-tone orange portion, and a mouth can be detected in the lower third of the lowered portion. Detecting 250 the eyes and the mouth can include using algorithms based on custom generated templates for orange-distance filtered images as described below in connection with FIG. 5. If eyes and a mouth cannot be found within the skin-tone orange portion of the acquired frame, a subsequent frame is acquired 210 by the appliance's camera and the method 200 is carried out in a manner described above.

An example use case illustrated in FIG. 1 depicts a user 110 that approaches an appliance 102 having its display 104 turned off to save battery life. The appliance's camera 106 is on and captures an image of the user 110 that stops in front of and faces the appliance 102. The appliance 102 can perform the process 200 described above on the captured image and may detect the user's face within the captured image. In some implementations, the appliance 102 can ask the user 110 to confirm the face detection. Confirmations can be used by the appliance 102 for training and refining the algorithms used for face detection.

Figure 3A:
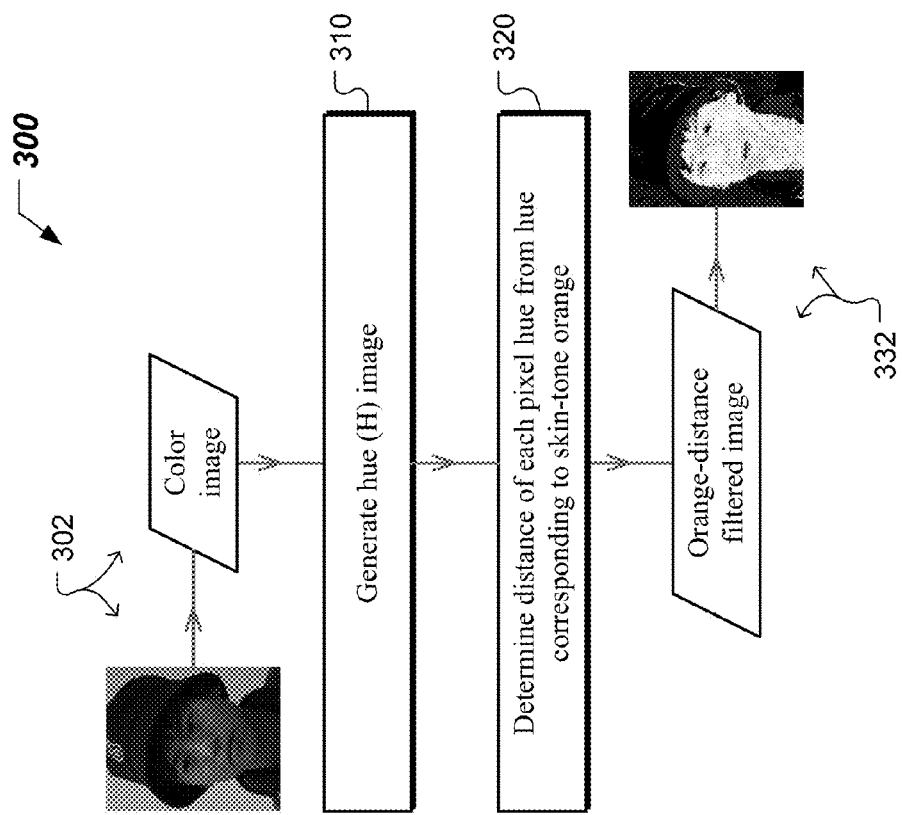
FIG. 3A shows an example of a method for preprocessing a color digital image by using an orange-distance filter.

FIG. 3A shows an example of a process 300 for preprocessing a color digital image 302 (referred to as color image) by using an orange-distance filter. In some implementations, the process 300 can be performed by a computerized device and can be implemented in any one or a combination of hardware, firmware and software. For example, referring to FIG. 1, the color image 302 can represent a frame captured by the appliance's camera 106. As another example, the color image can be obtained from a library of digital assets stored on a store of a computerized device.

Some image processing applications can perform skin-tone recognition by defining a target polygon within the red-green-blue (RGB) color space to represent skin color. Such image processing applications can verify whether the color detected in a pixel of an image is within the target polygon to determine whether the pixel corresponds to skin color. Such an approach for identifying portions of an image corresponding to skin-tone can be computationally expensive. In the case of method 300, the color image 302 is converted to a hue image, for increasing processing speed while reducing computational resources.

In some implementations, generating 310 the hue image includes converting the color image 302 from RGB color space to hue-saturation-luminosity (HSL) color space—where red corresponds to 0 degrees, green 120 degrees and blue 240 degrees. The lightness and saturation of analyzed pixels can be ignored (if an analyzed pixel has a ratio of chroma/saturation equal to 0, unless the analyzed pixel is pure white or pure black), and the hue of the analyzed pixels is compared to a predetermined hue interval (angular interval). In some implementations, generating 310 the hue image includes using a partial HSL conversion. An example of code that can be executed to generate the hue image starting from the color image 302 in RGB color space is described below (pixel[3] defines the input RGB color):

```
int hv = 0;
int lv = 255;
int h,l;
for (int i=0; i<3; i++)
{
  if (pixel[i]>hv)
  {
    hv = pixel[i];
    h = i;
  }
  if (pixel[i] < lv)
  {
    lv = pixel(i];
    l=i;
  }
}
// Get chroma
int c = hv-lv;
if (!c) exit 0; // No hue!
// Get hue
int hue = ((h?h:3)*120 + 60*(pixel[(h+1)%3]-
pixel[(h+2)%3])/c) % 360.
```

An orange-distance filtered image 332 can be generated by determining 320 a distance of each pixel hue from skin-tone hue. In implementations corresponding to hue-based color spaces (HSL color space and similar), the center of the hue interval corresponding to skin-tone can be chosen to be 25 deg (which is a hue value corresponding to skin-tone orange). In this case, the hue of an analyzed pixel can be characterized in terms of the distance from 25 deg (i.e., from orange) to the hue value of the analyzed pixel. For example, an orange-distance filtered image 332 can be generated by subtracting a value associated with skin-tone orange from the hue value corresponding to each pixel. As illustrated in FIG. 3A, the orange-distance filtered image 332 can be represented using 8-bits (256 levels), where a difference of zero degrees (orange) corresponds to 0, and a difference of ±180 degrees corresponds to 255.

Additionally, an example of code that can be executed to calculate the score (value) of a pixel of the orange-distance filtered image 332 is described below:

```
int s = hue – ORANGE_VALUE;
if (s > 180) s-= 360;
s = ORANGE_THRESH – abs(s);
if (s < 0) s = 0;
float score = (s*255)/ORANGE_THRESH;
```

As discussed above, an ORANGE_VALUE can be chosen to be 25, and an ORANGE_THRESH can be chosen to be 30. In implementations corresponding to 2-dimensional Cartesian hues, such as YUV color space, determining 320 a distance in hue space can include calculating a Cartesian distance from a point equivalent to skin-tone orange to the analyzed pixel.

Figure 3B:
FIGS. 3B, 3C and 3D are unprocessed and processed versions of an example color image.
Figure 3C:
Figure 3D:

Application of an orange-distance filter in accordance with method 300 prior to using targeted classifiers for facial features, and the like, generated for orange-distance filtered images, as described below in connection with FIG. 5, can potentially improve accuracy for skin-tone detection. FIG. 3B shows an example color image 302' acquired with a digital camera. The color image 302' includes a texture map represented in RGB color space, and regions of interest of color image 302' can include the subjects' skin 305, 306. FIG. 3C shows an image 332' obtained from the image 302' of FIG. 3B after application of an orange-distance filter. For example, the image 302' can be processed using the method 300 to generate image 332'. The skin-tone orange portions of the orange-distance filtered image 332', represented by pixel values at or near 255 in this example, correspond to skin-tone. For example, regions of interest for image 332' can include the subject's skin 335, 336. Such regions of interest of the orange-distance filtered image 332' corresponding to skin-tone can be targeted for subsequent processing as discussed below in connection with FIGS. 4-7. As shown in FIG. 3C, lighting effects on the skin-tone regions of the orange-distance filtered image 332' have been neutralized and facial features have been emphasized. Image 342 illustrated in FIG. 3D can be obtained from image 302' by applying a grey-scale transformation. In contrast with image 332', regions of image 342 corresponding to regions of interest (e.g., the subjects' skin 345, 346) share a common range of the grey scale with other regions 347, 348 of image 342 that do not correspond to the regions of interest.

Figure 4:
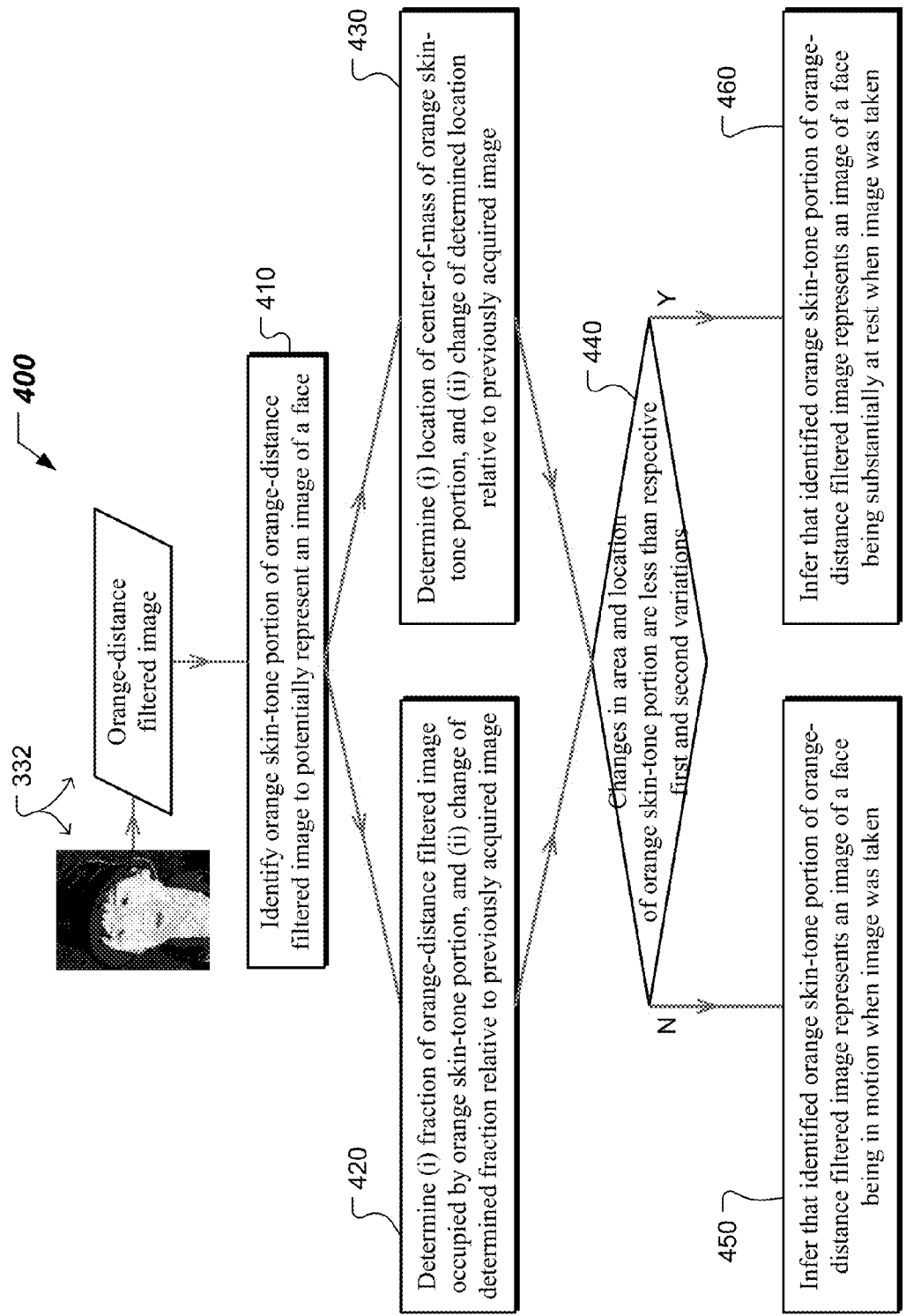
FIG. 4 shows an example of a process for detecting potential presence of a person's face in front of an image capture device and for inferring the person's level of attentiveness.

FIG. 4 shows an example of a process 400 for detecting potential presence of a person's face in front of a camera and for inferring the person's level of attentiveness. In some implementations, the process 400 can be performed by a computerized device and can be implemented in any one or a combination of hardware, firmware and software. For example, referring to FIGS. 1 and 3A, frames that are sequentially acquired by the appliance's camera 106 can be further preprocessed according to the method 300 to obtain orange-distance filtered images 332. The method 400 can process the obtained orange-distance filtered images 332 to determine whether an image of a person's face has been captured within a frame acquired by the appliance's camera 106 and to infer whether the person pays attention to the appliance 102. A display 104 of the appliance 102 can be turned on upon a positive outcome of the process 400.

A skin-tone orange portion of an orange-distance filtered image 332 is identified 410. Pixels having hue values for which respective distances to skin-tone orange are less than a threshold distance (e.g., 30 degrees from skin-tone orange—25 degrees—for HSL color space,) can be attributed to an image of a person's face. For such pixels, distances from respective hue values to orange skin-tone can be inverted and used as confidence scores. For example, if the distance from a hue value to skin-tone corresponding to a given pixel is 0, the confidence level is 100% that the hue of the given pixel matches skin-tone orange. Pixels having hue values for which respective distances to skin-tone orange are beyond the threshold distance can be masked out and ignored for subsequent analyses. Accordingly, method 400 can be implemented in hue space independently of brightness (luminosity and saturation dimensions of the color space). Thus, the effects of ethnicity and of highlights/shadows may be attenuated.

A fraction of a frame that is filled by a skin-tone orange portion of the image can be determined 420(i). The fraction can be calculated as a ratio of a number of pixels corresponding to skin-tone orange to a total number of pixels of the image and represents an area of the skin-tone orange portion. Further, a change of the skin-tone orange portion's area relative to the orange-distance filtered previously acquired image is determined 420(ii). For example, referring to FIG. 1, if the fraction of the skin-tone orange portion increases, a person 110 may be moving closer to the camera 106, while if the fraction of the skin-tone orange portion decreases, a person 110 may be moving back from the camera 106.

Additionally, a location of the skin-tone orange portion is determined 430(i). The location can be calculated as a pixel (x_CM, y_CM) corresponding to a center of mass of the skin-tone orange portion. The x-coordinate of the center of mass x_CM can be calculated as $1/n*Sum\_\{i<=n\}(x\_i)$, where n is the number of pixels in the skin-tone orange portion, and x_i is the x-coordinate of the $i^{th}$ pixel of the skin-tone orange portion, where i=1, 2, . . . , n. Similarly, the y coordinate of the center of mass y_CM can be calculated as $1/n*Sum\_\{i<=n\}(y\_i)$, where n is the number of pixels in the skin-tone orange portion, and y_i is the x-coordinate of the $i^{th}$ pixel of the skin-tone orange portion, where i=1, 2, . . . , n. Further, a change of the skin-tone orange portion's location relative to the orange-distance filtered previously acquired image is determined 430(ii). For example, referring to FIG. 1, if the center of mass (x_CM, y_CM) of the skin-tone orange portion changes location (i.e., drifts, shifts, oscillates, etc.,) the person 110 may be moving laterally in front of the camera 106.

The determined changes in area and position of the skin-tone orange portion of the analyzed orange-distance filtered image 332 relative to the orange-distance filtered previously acquired image are compared 440 with first and second predetermined variations, respectively. For example, referring to FIG. 1, the appliance 102 infers 450 that a user's face is moving toward or backing away from the front of the camera 106 if the skin-tone orange portion increases or decreases, respectively, by more than a first predetermined relative variation, e.g., 5%, between orange-distance filtered images 332 that have been consecutively acquired. As another example, the appliance 102 infers 450 that a user's face is moving laterally in front of the camera 106 if the location of the skin-tone orange portion changes by more than a second predetermined variation, e.g., 5 pixels, between orange-distance filtered images 332 that have been consecutively acquired.

However, the appliance 102 infers 460 that a user's face is substantially at rest when the orange-distance filtered image was taken if the determined changes in area and position of the skin-tone orange portion of the analyzed orange-distance filtered image relative to the orange-distance filtered previously acquired image are respectively less than the first and second predetermined variations.

In some implementations, method 400 can be used in combination with method 300 by an appliance 102 to detect presence and/or motion of skin-tone in sequentially acquired video frames. In this manner, a display 104 of the appliance 102 may be switched off if no moving skin-tone is detected in the field of view of the appliance's video camera 106.

Figure 5:
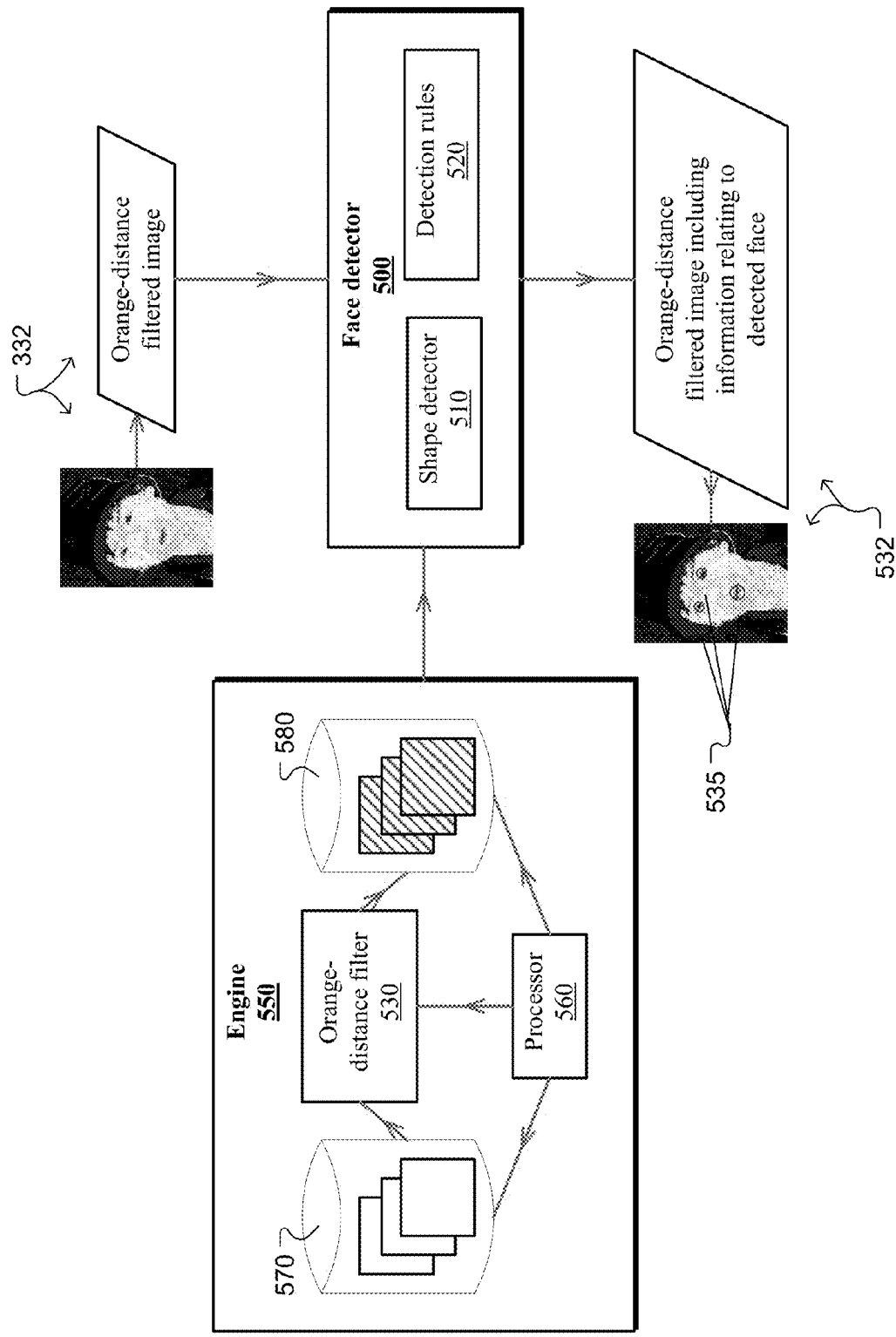
FIG. 5 shows a face detector configured to use shape detection classifiers generated by an engine to perform face detection in an orange-distance filtered image.

FIG. 5 shows a face detector 500 configured to use shape detection profiles generated by an engine 550 to perform face detection in an orange-distance filtered image 332. The face detector 500 includes a shape detector 510 configured to detect eyes, a mouth, a nose, and the like, based on a combination of detection rules 520 and shape classifiers 580 corresponding to orange-distance filtered images 332.

In some implementations, the face detector 500 can be implemented in any one or a combination of hardware, firmware and software of a computerized device. For example, referring to FIGS. 1, 3A and 4, frames that are sequentially acquired by the appliance's camera 106 can be preprocessed in accordance with the method 300 to obtain orange-distance filtered images 332. The preprocessed images 332 can be further segmented 410 into skin-tone orange portions according to method 400 to identify the likely location of a face. The face detector 500 is configured to (i) detect a face within the segmented skin-tone orange portions, and to (ii) generate information 535 including at least locations of the detected eyes, the mouth, and like. The circles 535 do not appear in the actual processed image 532, instead they are illustrated in FIG. 5 for annotation purposes. In some implementations, the orange-distance filtered image 532 including information 535 relating to the detected face can be further processed to recognize the detected face among one or more target faces, and to turn on a display 104 of an appliance 102 associated with the recognized face, for instance.

Object detection technologies can use an engine 550 for generating shape classifiers (also known as profiles or templates) corresponding to various parts (components, portions, and the like) of the object to be detected. In some implementations relating to face detection, the engine 550 for generating the shape classifiers contains at least a hardware processor 560 and a classification library 570 including images of shapes to be classified and identified, for example, nose shapes (frontal view, side view, etc.), eye shapes, mouth shapes, etc. Images in the classification library 570 can be preprocessed by the processor 560 with a variety of filters, such as edge-enhancement filters, Gaussian blur filters, sharpening filters, and the like.

Additionally, the processor 560 can apply an orange-distance filter 530 to the images in the classification library 570 to obtain a classification library 580 of orange-distance filtered images. The classifiers generated by the engine 550 in this manner and stored in classification library 580 represent combinations of shape images and their corresponding information including (i) geometrical locations of various shapes within a face and (ii) distances between hue values and orange skin-tone for the various shapes. Moreover, the shape templates built by processor 560 in the manner described above and stored in the custom generated classification library 580 can be used for face detection within orange-distance filtered images 332.

The location of a face can be identified within an orange-distance filtered image 332 in accordance with method 400. Based on a likely orientation of the detected face (e.g., vertical orientation as depicted in the orange-distance filtered image 332), the shape detector 510 can locate the eyes and the mouth in the upper ⅓ and the lower ⅓, respectively, of the identified face area in accordance with detection rules 520 maintained by the face detector 500, and according to a subset of shape classifiers 580 for detecting at least the face, eyes, mouth and their relative locations 535 within orange-distance filtered images. In some implementations, the foregoing detection rules 520 about the relative locations of the eyes and mouth with respect to the face area allows the shape detector 510 to use primitive algorithms for eyes and mouth detection obtained from the engine 550. The use of such primitive algorithms enables implementation of the face detector 500 in hardware, for example in one or more GPUs of the appliance 102, such that the face detector 500 can be operated with minimal battery consumption by the appliance 102.

An example use case of a combination of methods 300 and 400 and of a face detector 500 is described below. Referring to FIGS. 1, 3A and 4-5, frames that are sequentially acquired by the appliance's camera 106 can be preprocessed according to the method 300 to obtain orange-distance filtered images 332. The preprocessed images 332 can be further segmented 410 into skin-tone orange portions according to method 400 to identify the likely location of a face. A face detector 500 can (i) detect a face within the segmented skin-tone orange portions, and can (ii) generate information including locations the detected face's eyes and mouth. The image 644 of the detected face can be further compared with images of one or more target faces corresponding to profiles of users associated with the appliance 102. If the detected face can be matched with one of the target faces, the appliance 102 can present the authenticated user with a personalized configuration in accordance with a profile associated with the authenticated user.

A multitude of computing devices may be used to implement the systems and methods described in this document, as either a client or as a server or plurality of servers. A computing device can be implemented in various forms of digital computers, such as laptops, desktops, workstations, personal digital assistants, servers, blade servers, mainframes, and other appropriate computers. Another computing device can be implemented in various forms of mobile devices, such as personal digital assistants, cellular telephones, smartphones, and other similar computing devices. Additionally, computing devices can include Universal Serial Bus (USB) flash drives. The USB flash drives may store operating systems and other applications. The USB flash drives can include input/output components, such as a wireless transmitter or USB connector that may be inserted into a USB port of another computing device. The components described here, their connections and relationships, and their functions, are meant to be exemplary only, and are not meant to limit implementations of the inventions described and/or claimed in this document.

A computing device can include a processor, memory, a storage device, a high-speed interface connecting to memory and high-speed expansion ports. The computing device can further include a low speed interface connecting to a low speed bus and a storage device. Each of the above components can be interconnected using various busses, and may be mounted on a common motherboard or in other manners as appropriate. The processor can process instructions for execution within the computing device, including instructions stored in the memory or on the storage device to display graphical information for a GUI on an external input/output device, such as a display coupled to high speed interface. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory can store information within the computing device. In one implementation, the memory can be a volatile memory unit or units. In another implementation, the memory can be a non-volatile memory unit or units. The memory may also be another form of computer-readable medium, such as a magnetic or optical disk.

The storage device can provide mass storage for the computing device. In one implementation, the storage device may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory, the storage device, or memory on processor.

The high speed controller can manage bandwidth-intensive operations for the computing device, while the low speed controller can manage lower bandwidth-intensive operations. Such allocation of functions is exemplary only. In one implementation, the high-speed controller can be coupled to memory, to a display (e.g., through a graphics processor or accelerator), and to high-speed expansion ports, which may accept various expansion cards. In the implementation, low-speed controller can be coupled to the storage device and the low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device may be implemented in a number of different forms. For example, it may be implemented as a standard server, or multiple times in a group of such servers. It may also be implemented as part of a rack server system. In addition, it may be implemented in a personal computer such as a laptop computer. Alternatively, components from computing device may be combined with other components in a mobile device. Each of such devices may contain one or more computing devices or mobile devices, and an entire system may be made up of multiple computing devices and mobile devices communicating with each other.

A mobile device can include a processor, memory, an input/output device such as a display, a communication interface, and a transceiver, among other components. The mobile device may also be provided with a storage device, such as a microdrive or other device, to provide additional storage. Each of the above components is interconnected using various buses, and several of the components may be mounted on a common motherboard or in other manners as appropriate.

The processor can execute instructions within the mobile device, including instructions stored in the memory. The processor of the mobile device may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the mobile device, such as control of user interfaces, applications run by the mobile device, and wireless communication by the mobile device.

The processor of the mobile device may communicate with a user through control interface and display interface coupled to a display. The display may be, for example, a Thin-Film- Transistor Liquid Crystal display or an Organic Light Emitting Diode display, or other appropriate display technology. The display interface may include appropriate circuitry for driving the display to present graphical and other information to a user. The control interface may receive commands from a user and convert them for submission to the processor of the mobile device. In addition, an external interface may provide in communication with processor of the mobile device, so as to enable near area communication of the mobile device with other devices. The external interface may provide, for example, for wired communication in some implementations, or for wireless communication in other implementations, and multiple interfaces may also be used.

The memory stores information within the computing mobile device. The memory can be implemented as one or more of a computer-readable medium or media, a volatile memory unit or units, or a non-volatile memory unit or units. An expansion memory may also be provided and connected to the mobile device through an expansion interface, which may include, for example, a SIMM (Single In Line Memory Module) card interface. Such expansion memory may provide extra storage space for the mobile device, or may also store applications or other information for the mobile device. Specifically, expansion memory may include instructions to carry out or supplement the processes described above, and may include secure information also. Thus, for example, expansion memory may be provide as a security module for the mobile device, and may be programmed with instructions that permit secure use of device. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory, expansion memory, or memory on processor that may be received, for example, over transceiver or external interface.

The mobile device may communicate wirelessly through communication interface, which may include digital signal processing circuitry where necessary. Communication interface may provide for communications under various modes or protocols, such as GSM voice calls, SMS, EMS, or MMS messaging, CDMA, TDMA, PDC, WCDMA, CDMA2000, or GPRS, among others. Such communication may occur, for example, through a radio-frequency transceiver. In addition, short-range communication may occur, such as using a Bluetooth, WiFi, or other such transceiver (not shown). In addition, GPS (Global Positioning System) receiver module may provide additional navigation- and location-related wireless data to the mobile device, which may be used as appropriate by applications running on the mobile device.

The mobile device may also communicate audibly using audio codec, which may receive spoken information from a user and convert it to usable digital information. Audio codec may likewise generate audible sound for a user, such as through a speaker, e.g., in a handset of the mobile device. The sound may include sound from voice telephone calls, may include recorded sound (e.g., voice messages, music files, etc.) and may also include sound generated by applications operating on the mobile device.

The mobile computing device may be implemented in a number of different forms. For example, it may be implemented as a cellular telephone. It may also be implemented as part of a smartphone, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by an image processor, the method comprising:
   receiving a first digital image frame from among a series of digital image frames, the first digital image frame comprising pixels, each pixel having a corresponding hue value;
   determining a distance value between each of the first digital image frame's hue values and a specified hue value corresponding to skin-tone orange;
   generating a first orange-distance filtered frame based, at least in part, on the determined distance values; and
   deciding whether the first digital image frame includes a depiction of human skin based, at least in part, on:
     determining that the first orange-distance filtered frame comprises a first skin-tone orange portion, wherein the first skin-tone orange portion comprises distance values that are less than a threshold distance value;
     accessing shape classifiers generated for detecting shapes corresponding to faces within skin-tone orange portions of orange-distance filtered images, wherein the shape classifiers are generated by:
       retrieving, from a shape library, images of shapes and shape combinations corresponding to a face depicted in a given color space, wherein the shapes corresponding to the face include at least an eye, a nose, and a mouth, and wherein the shape combinations corresponding to the face include at least eyes, eyes and a nose, and a nose and a mouth;
       producing orange-distance filtered versions of the retrieved images of shapes and shape combinations; and
       assembling the orange-distance filtered images of shapes and shape combinations into the generated shape classifiers; and
     detecting a face within the first skin-tone orange portion of the first orange-distance filtered frame by using the accessed shape classifiers.

2. The method of claim 1, wherein the specified hue value comprises a value selected from a range of hue values.

3. The method of claim 1, wherein the act of determining a distance value is performed in a hue space defined by an angular coordinate such that red corresponds to zero degrees, green corresponds to 120 degrees and blue corresponds to 240 degrees, and wherein the distance value is determined by subtracting a hue value of 25 degrees corresponding to skin-tone orange from the first digital image frame's hue values.

4. The method of claim 1, wherein the act of determining a distance value is performed in a two-dimensional (2D) hue space, wherein the distance value is determined by calculating a 2D Cartesian distance value from hue-coordinates that specify the first digital image frame's hue values to a location in 2D color space corresponding to skin-tone orange.

5. The method of claim 1, further comprising:
   receiving a second digital image frame from the series of digital image frames;
   generating a second orange-distance filtered frame corresponding to the second digital image frame;
   identifying a second skin-tone orange portion in the second orange-distance filtered frame;
   determining a change in area between the first skin-tone orange portion and the second skin-tone orange portion; and
   determining a change in location between the first skin-tone orange portion and the second skin-tone orange portion.

6. The method of claim 5 further comprising detecting a face within the second skin-tone orange portion when the determined changes in area and location are less than respective predetermined variations.

7. An appliance comprising:
   a non-transitory data storage device configured to store rules for acknowledging a detected face;
   an image capture device configured to acquire color frames, each acquired frame comprising pixels, each pixel having a corresponding hue value; and
   one or more data processors configured to execute program code stored in the non-transitory data storage device to cause the one or more data processors to:
     apply an orange-distance filter to a first frame and a second frame acquired by the image capture device to identify skin-tone orange portions of the first and second acquired frames, wherein the orange-distance filter identifies distance values between the acquired frames' hue values and a hue value corresponding to skin-tone orange;
     determine respective changes in an area and a location between the skin-tone orange portions of the first and second acquired frames;
     infer, based on the determined changes, a presence of a face substantially at rest when the second frame was acquired;
     detect a face within the skin-tone orange portion of the second acquired frame in response to the inference and based, at least in part on:
       accessing shape classifiers generated for detecting shapes corresponding to faces within skin-tone orange portions of orange-distance filtered images, wherein the shape classifiers are generated by:

retrieving, from a shape library, images of shapes and shape combinations corresponding to a face depicted in a given color space, wherein the shapes corresponding to the face include at least an eye, a nose, and a mouth, and wherein the shape combinations corresponding to the face include at least eyes, eyes and a nose, and a nose and a mouth;

producing orange-distance filtered versions of the retrieved images of shapes and shape combinations; and assembling the orange-distance filtered images of shapes and shape combinations into the generated shape classifiers; and using the accessed shape classifiers; and acknowledge the detected face in accordance with a predetermined rule stored on the non-transitory data storage device of the appliance.

8. The appliance of claim 7, wherein the program code to cause the one or more processors to apply an orange-distance filter comprises program code to cause the one or more processors to:

generate a first orange-distance filtered frame corresponding to the first acquired frame and a second orange-distance filtered frame corresponding to the second acquired frame, wherein the orange-distance filtered frames are generated based on the identified distance values between the acquired frames' hue values and the hue value corresponding to skin-tone orange; and identify a portion of the first and second orange-distance filtered frames within which the identified distance values are less than a threshold distance value as the skin-tone orange portions of the first and second acquired frames.

9. The appliance of claim 8, wherein the orange-distance filter is applied in a hue space defined by an angular coordinate such that red corresponds to zero degrees, green corresponds to 120 degrees and blue is corresponds to 240 degrees, and wherein the program code to cause the one or more processors to apply the orange-distance filter comprises program code to cause the one or more processors to identify the distance values between the acquired frames' hue values and the hue value corresponding to skin-tone orange by subtracting a hue value of 25 degrees from the acquired frames' hue values.

10. The appliance of claim 8, wherein the orange-distance filter is applied in a two-dimensional (2D) hue space, and wherein the program code to cause the one or more processors to apply the orange-distance filter comprises program code to cause the one or more processors to identify the distance values between the acquired frames' hue values and the hue value corresponding to skin-tone orange by calculating a 2D Cartesian distance from hue-coordinates that specify the acquired frames' hue values to a location in 2D color space corresponding to skin-tone orange.

11. The appliance of claim 7, wherein the program code to cause the one or more processors to acknowledge the detected face comprises program code to cause the one or more processors to turn on a display of the appliance located on a same side as the image capture device, wherein the display had been off prior to the face detection.

12. The appliance of claim 7, wherein the program code to cause the one or more processors to acknowledge the detected face comprises program code to cause the one or more processors to turn on a transceiver of the appliance which was turned off prior to the face detection.

13. A system comprising:

a non-transitory storage system configured to store shape classifiers used for face detection; and one or more data processors configured to execute program code to cause the one or more data processors to:

retrieve, from a shape library stored on the non-transitory storage system, images of shapes and shape combinations corresponding to a face depicted in a given color space, wherein the shapes corresponding to the face include at least an eye, a nose, and a mouth, and wherein the shape combinations corresponding to the face include at least eyes, eyes and a nose, and a nose and a mouth;

produce orange-distance filtered versions of the retrieved images of shapes and shape combinations, wherein the orange-distance filtered version of each of the retrieved images provides information representative of distance values between a hue value of pixels in the retrieved image and a hue value corresponding to skin-tone orange;

generate shape classifiers for detecting shapes corresponding to faces within skin-tone orange portions of orange-distance filtered images of shapes and shape combinations;

store the generated shape classifiers to be provided upon requests of image processing devices that connect to the system;

receive a request from an image processing device to access the shape classifiers; and detect a face within a first skin-tone orange portion of a first orange-distance filtered frame acquired by the image processing device by using the accessed shape classifiers.

14. The system of claim 13, further comprising program code to cause the one or more processors to:

maintain rules to apply the generated shape classifiers to detect faces within skin-tone orange portions of orange-distance filtered images; and update the maintained rules based on feedback collected from the image processing devices that have applied the generated shape classifiers and maintained rules.

15. The system of claim 13, wherein the program code to cause the one or more processors to produce orange-distance filtered versions of the retrieved images of shapes and shape combinations comprises program code to cause the one or more processors to:

convert the retrieved images of shapes and shape combinations to a hue space defined by an angular coordinate such that red corresponds to zero degrees, green corresponds to 120 degrees and blue corresponds to 240 degrees; and calculate the distance values between the hue value of pixels in the retrieved images and the hue value corresponding to skin-tone orange by subtracting a hue value of 25 degrees corresponding to skin-tone orange from the hue value of the pixels in the retrieved images.

16. The system of claim 13, wherein the program code to cause the one or more processors to produce orange-distance filtered versions of the retrieved images of shapes and shape combinations comprises program code to cause the one or more processors to:

convert the retrieved images of shapes and shape combinations to a two-dimensional (2D) hue space; and
calculate 2D Cartesian distance values from hue-coordinates specifying the hue value of the pixels in the retrieved images to a location in 2D color space corresponding to skin-tone orange.

* * * * *

UNITED STATES PATENT AND TRADEMARK OFFICE
CERTIFICATE OF CORRECTION

PATENT NO. : 8,824,747 B2  Page 1 of 1
APPLICATION NO. : 12/826617
DATED : September 2, 2014
INVENTOR(S) : Robert Mikio Free It is certified that error appears in the above-identified patent and that said Letters Patent is hereby corrected as shown below:

In the Claims

Column 17, Line 39 (Claim 9, line 4) replace "blue is corresponds to" with --blue corresponds to--.

Signed and Sealed this
Eleventh Day of November, 2014

Michelle K. Lee
*Deputy Director of the United States Patent and Trademark Office*